Nov. 19, 1940.  V. E. ACKLES  2,222,390

MACHINE FOR FROSTING BAKERY PRODUCTS

Filed Oct. 20, 1937  4 Sheets-Sheet 1

Inventor
Virgil E. Ackles;
R. S. Berry
Attorney

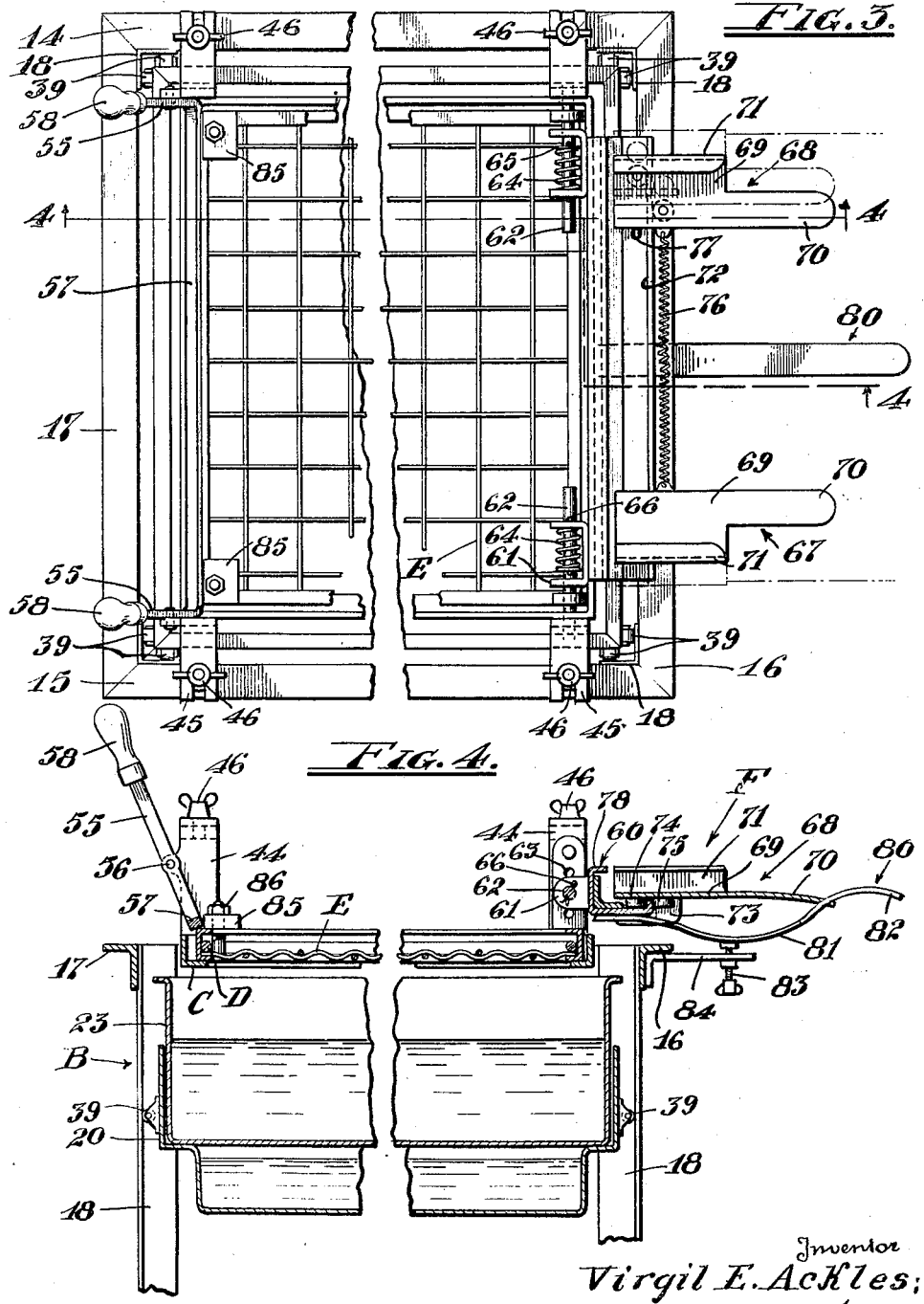

Nov. 19, 1940. V. E. ACKLES 2,222,390
MACHINE FOR FROSTING BAKERY PRODUCTS
Filed Oct. 20, 1937 4 Sheets-Sheet 3
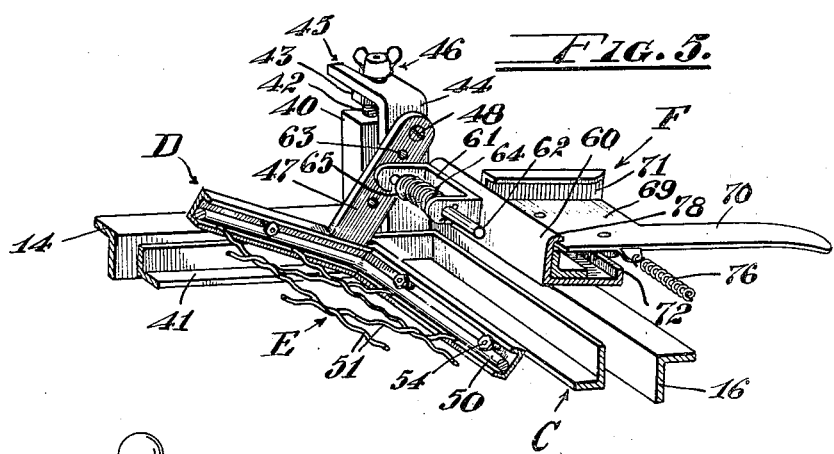
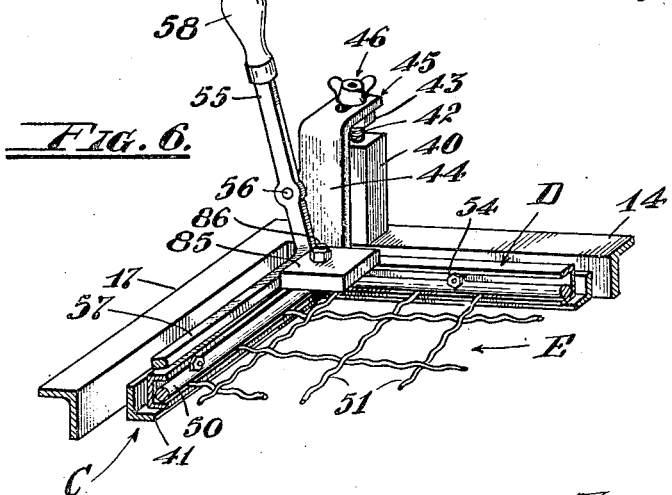
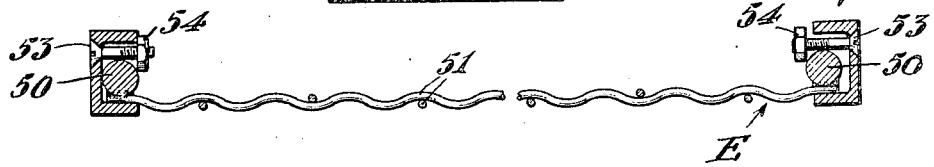
Virgil E. Ackles, Inventor

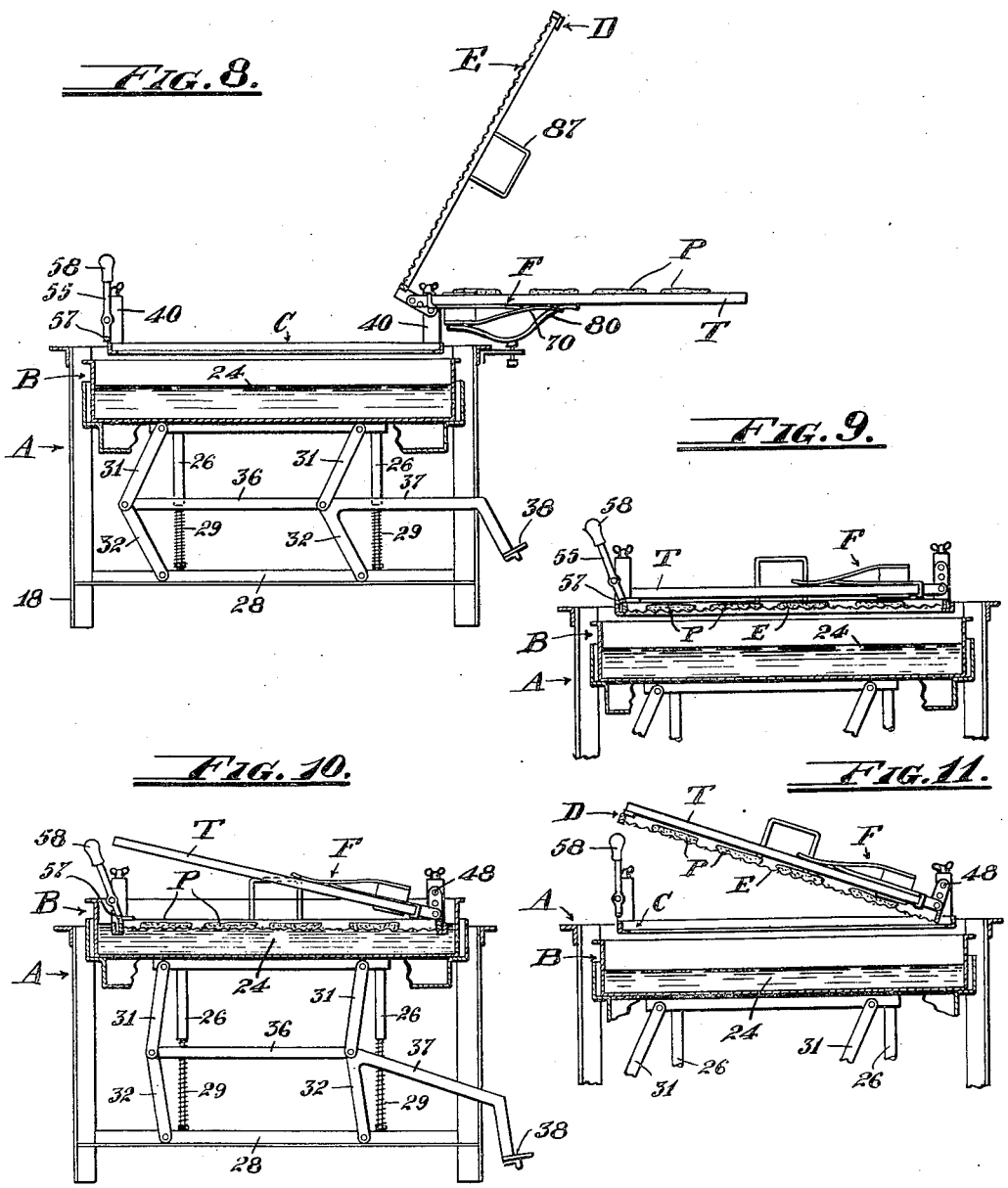

Patented Nov. 19, 1940

2,222,390

UNITED STATES PATENT OFFICE 2,222,390

MACHINE FOR FROSTING BAKERY PRODUCTS

Virgil E. Ackles, Los Angeles, Calif.

Application October 20, 1937, Serial No. 170,028

6 Claims. (Cl. 91—4)

This invention relates to a machine for applying frosting or similar coatings to bakery products such as buns, rolls, cakes and the like, and has as its primary object the provision of a mechanism whereby a plurality of the products as carried on a tray in which they were baked may be collectively coated on their upper surfaces by bringing such surfaces into contact with a batch of the coating material.

In machines of the above character now on the market the bakery products are delivered from a tray thereof in an inverted position onto a screen which is manually depressed by hand operation into the surface of a batch of coating material in such manner as to bring the inverted upper surfaces of the product into contact with the material, then lifting the screen out of the material and restoring the products to their upright position on the tray from which they were initially delivered. This mode of operation has been found objectionable in that because of the density and cohesiveness of the coating material considerable manual effort is required to press the screen into a submerged position in the material and to lift it therefrom, and accordingly the employment of an operator of considerable strength and endurance is required in actuating the mechanism in a large number of successive operations, as is usually practiced in the manufacture of bakery products.

A purpose of the present invention is to provide a construction and mode of operation in a machine for the purpose above set forth whereby the bakery products and the coating material may be brought into contact with each other with greater facility and effectiveness than heretofore.

Another object of the invention is to provide a construction whereby instead of advancing a screen in and out of a body of coating material, as commonly practiced, the screen carrying the bakery products is held stationary and the mass of coating material raised and lowered relative to the screen to bring the material in and out of contact with bakery products inverted on the screen.

A further object is to provide an improved means for effecting transfer of bakery products from a baking tray to the screen preparatory to applying the coating to the products, and thereafter returning the coated products from the screen to the tray.

Another object is to provide a mechanism with an adjustment whereby it may be adapted for operation on bakery products of various thickness.

Another object is to provide a construction in the screen element whereby the screen is rendered readily inter-changeable so that screens of various sizes of mesh may be employed as occasion may require.

Another object is to provide a construction in the screen whereby it is rendered durable and whereby slack occuring therein may be taken up from time to time as needed so as to maintain the screen taut.

A further object is to provide a mechanism with a tray engaging and supporting means which is self-adjustable to accommodate trays of slightly different dimensions.

With the foregoing objects in view, together with such other objects and advantages as may subsequently appear, the invention is carried into effect as illustrated by way of example in the accompanying drawings in which:

Fig. 3 is a plan view of the machine with portions broken away;

Fig. 4 is a view of the machine in longitudinal section as seen on the line 4—4 of Fig. 3;

Fig. 5 is a perspective view of a fragmentary part of the upper portion of the front end of the machine showing the manner of mounting the tray holder, and also depicting the manner of forming and mounting the screen associated with the holder;

Fig. 6 is a perspective view of a fragmentary portion of the upper portion of the rear end of the machine depicting a means employed in holding the screen in a fixed position while effecting application of the coating material to the bakery products carried on the screen;

Fig. 7 is a view in cross section of the screen and its mounting;

Figs. 8, 9, 10 and 11 are diagrams depicting the mode of operation of the machine.

Figure 1:
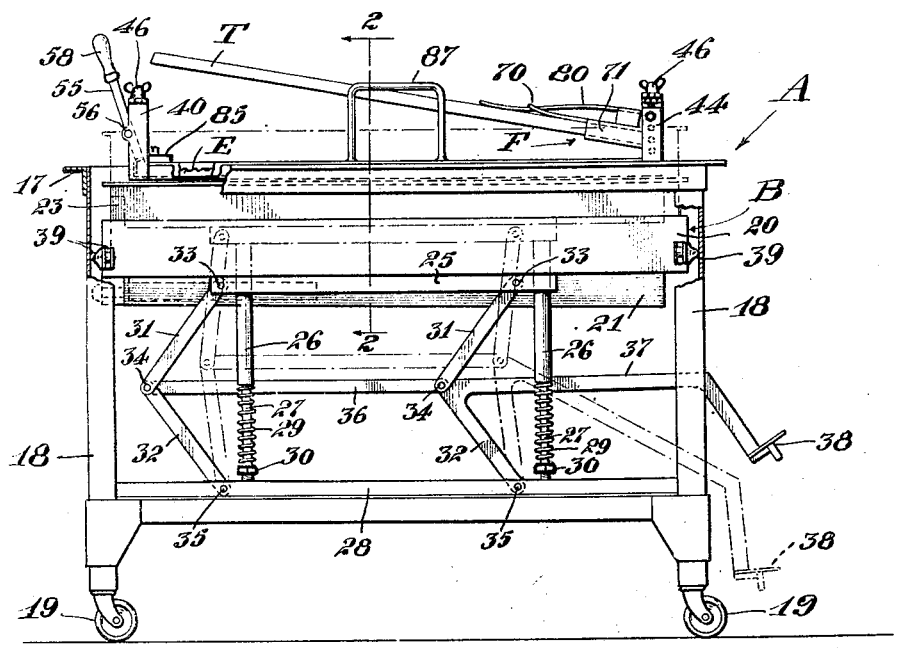
Fig. 1 is a view of the machine as seen in side elevation with portions broken away and indicating in full lines the parts as disposed in their normal position and indicating in dotted lines parts disposed in an alternate position.

Referring to the drawings more specifically A indicates generally the frame of the machine which may be of any suitable construction but which is here shown as embodying a rectangular top member including parallel side rails 14 and 15 and front and rear end rails 16 and 17, which top member is formed of angle-iron and is carried at its corners on angle-iron standards 18 fitted with castors 19.

Mounted for vertical movement within and relative to the frame A is a double-boiler B embodying a basin 20 having a recessed bottom portion 21 for the reception of water to be heated, and which basin is equipped with a conventional electrical heating element 22 positioned in the recessed bottom portion of the basin for submersion in water contained in the latter. The double-boiler also includes a rectangular reservoir 23 which is demountably seated in the basin 20 to extend over the recessed portion of the latter and which reservoir contains frosting or other coating material 24 which is maintained in a desired state of fluidity by heating of the water in the basing 20.

As here shown the basin 20 is carried at its opposite side portions on a pair of horizontally extending parallel side bars 25 adjacent the ends of which are downwardly extending sleeves 26 which are fixedly secured to the bars 25 and into the open lower ends of which extend rods 27 erected on side rails 28 carried on the standard 18; the rods 27 and sleeves 26 being slidably telescoped so that the sleeves 26 may move vertically on and be guided by the rods 27. Coil springs 29 encircle the rods 27 and bear against the lower ends of the sleeves 26, and seat at their lower ends on adjustment nuts 30 screwed on the rods 27 and adapted to be adjusted longitudinally of the latter to vary the tension of the springs 29, as occasion may require, and which tension is designed to be such as to normally support the sleeves 26 with the associated basin 20 and reservoir 23 and the contents thereof in an elevated position, which elevated position, however, is slightly below that to which the double-boiler is designed to be upwardly moved.

Means are provided for raising and lowering the double-boiler, which means, as here shown, embodies a series of pairs of vertically arranged toggle links 31 and 32; there being a pair of such links arranged at each end of each of the supporting bars 25 with the links 31 connected with the bars by pivots 33 from which the links 31 depend, and are connected by pivot pins 34 to the links 32 which latter are connected by pivots 35 to the side rails 28.

The pairs of toggle links on each supporting bar 25 are connected together by a tie bar 36 connecting at its ends with the pivots 34.

Fixed to and extending forwardly from the upper ends of the forward links 32 are lever arms 37 the outer end portions of which project from the front end of the machine frame A and are connected to a cross bar 38 arranged for convenient engagement by the foot of an operator whereby the links may be actuated to effect vertical movement of the double-boiler B.

As a means for guiding the double-boiler in its vertical movement, each corner of the basin 20 is fitted with a pair of rollers 39 which bear at right angles to each other against the inner faces of the adjacent angle-iron standard 18 as particularly shown in Fig. 3; the rollers 39 serving also in conjunction with the standards 18 to prevent horizontal movement of the double-boiler under thrusts imposed thereon such as might cause the sleeves 26 to bind on the rods 27.

Erected on the side rails 14 and 15 adjacent each end thereof is a column 40, which columns collectively support a fixed but demountable and adjustable rectangular frame C arranged to extend horizontally over the reservoir 23 in close proximity to the upper margin of the latter. The frame C is formed of angle-iron arranged with one web thereof projecting inwardly from the other web to provide an inwardly projecting flange 41 extending throughout the length of the sides and ends of the frame.

As a means for permitting vertical adjustment of the corners of the frame C relative to the supporting columns 40 the upper end of each of the columns is fitted with a vertically extending screw 42 on which is threaded a nut 43, and each corner of the frame C is fitted with a bracket 44 extending upwardly therefrom and having a horizontally extending upper end portion terminating in a yoke 45 positioned astride the screw 42 and seating on the nut 43. By raising or lowering a nut 43 on a screw 42 the contiguous corner of the frame supported by the nut through the bracket 34 may be raised or lowered. The upper end of the screw 42 projecting above the yoke 45 is fitted with a wing nut 46 by which the yoke 45 may be clamped against the nut 43 so as to rigidly hold the adjustable frame C against movement relative to the machine frame A.

The frame C is designed to afford a support for a vertically oscillatory screen carrying frame D having side and end members formed of channel iron arranged with the channel thereof opening to the inner margin of the frame for the reception of side and end members of a demountable screen E, as will presently be described.

The end of the screen supporting frame D presented toward the front end of the machine frame A from which the foot operated lever arms 37 project, is fitted with upstanding arms 47 which are pivotally connected at their outer ends by pivot pins 48 to the contiguous brackets 44 of the adjustable frame C, whereby the frame D is supported for vertical swinging movement toward and away from the forward end of the machine frame A.

The screen E embodies a substantially rectangular flexible wire frame 50 the outside dimensions of which are such as to permit positioning of the side and end members of the wire frame 50 within the channels of the side and end members of the supporting frame D.

Carried by the side and end members of the wire frame 50 are crossed lengths of corrugated wires 51 extending longitudinally and transversely of the wire frame 50 with their ends affixed, as by spot welding, to the wire frame. By thus forming the wires 51 with corrugations the screen is rendered elastic so that the end and side members of the wire frame 50 may be sprung outwardly throughout the major portion of their lengths, and whereby the corrugated wires 51 may be stretched and placed under tension, and whereby the screen frame may be expanded so that its side and end members will extend into the channels of the frame D.

As a means for effecting expansion of the screen frame 50 and for fastening it to the supporting frame D the latter is fitted with a series of screws 53 which extend through the side wall of the frame side and end members and project across the channels thereof, and which screws are fitted with nuts 54 on their threaded outer ends arranged to engage the inner margins of the side and end members of the wire frame 50, as particularly shown in Fig. 7, in such fashion that on tightening the nuts 54 on the screws 53 the side and end members of the frame 50 will be sprung outwardly in opposition to the tension of the corrugated wires 51. The nuts 54 and screws 53 are utilized to take up any slack as might develop in the screen from time to time during use thereof, as well as serving as a detachable fastening for the screen whereby the screen may be readily removed and replaced thereby facilitating the employment of screens of various sizes of mesh, and also facilitating the removal of the screen for repairs.

Means are provided for temporarily locking the screen supporting frame D against movement relative to its supporting frame C, which means as here shown embodies a pair of lever arms 55 pivoted at 56 to the rear columns 40, the lower ends of which arms are connected together by a cross bar 57 arranged on swinging the lever arms 55 to be moved in and out of a position overlying and contacting the outer end member of the frame D; the outer upper ends of the lever arms 55 being fitted with handles 58 adapted to be readily grasped by an operator to actuate the lever arms in effecting engagement or release of the frame D.

A tray holder F is provided at the forward end of the machine and arranged in association with the screen supporting frame D and which tray holder, as here shown, embodies a horizontal rail 60 pivotally supported at its ends for vertical swinging movement on the arms 47; the rail 60 being fitted on the back and adjacent each end thereof with a yoke 61 carrying a retractable pivot pin 62 one end of which is slidably engaged with one of a series of openings 63 formed in the contiguous arm 47. Any suitable number of the openings 63 may be provided in each arm 47 according to requirements, but in event a plurality of such openings are used, they are arranged with adjacent openings spaced apart longitudinally of the arm so that the pivotal connection afforded by the pins 62 may be effected at different positions along the lengths of the arms 47, whereby in the operation of the machine as herein later described, the tray holder may be disposed so that trays carried thereon may be disposed in various adjusted spaced relations to the screen E when the holder and screen are folded toward each other and thereby accommodate the machine to the handling of bakery products of various thicknesses.

Each of the pins 62 is normally maintained in an advanced position under the urge of a spring 64 wound around the pin and bearing between one side member of the yoke 61 and an abutment 65 on the pin 62; a stop 66 on the pin 62 being arranged to abut the yoke and limit advance movement of the pin 62 by the spring 64.

Mounted on the rail 60 is a pair of tray engaging members 67 and 68, the member 67 being fixed on the rail 60, and the member 68 being mounted on the rail for movement toward and away from the member 67 so as to accommodate the holder to receive trays of slightly different widths. The members 67 and 68 each include a bottom plate 69 from the forward edge of which extends a resilient arm 70, and which plates are formed with upwardly and inwardly extending flanges 71 on their outer edges forming channels for engagement with the margins of a tray.

The moveable member 68 is arranged with the plate 69 thereof slidably seating on an upstanding flange 72 on the rail 60, and a bracket 73 mounted on the underside of the plate is extended beneath the rail.

Rollers 74 and 75 mounted on the plate 69 bear on the inner and outer faces of the flange 72 in spaced relation to each other longitudinally of the flange. A spring 76 connects the plates 69 and acts to normally dispose the member 68 in an advanced position relative to the member 67 and yieldably opposes movement of the member 68 away from the member 67 so as to effect clamping action on the edges of a tray interposed between said members.

A fixed pin 77 on the rail 60 serves as a stop against which the member 68 abuts to limit advance movement of the latter.

The rail 60 is formed with a ledge 78 for overlying the edge of a tray seated on the members 67—68.

As a means for cushioning movement of a loaded tray when depositing it on the tray holder F a plate spring 80 is mounted to project from the rail 60 and is formed with a downwardly curved intermediate portion 81 and an upwardly curved outer end portion 82; the spring being arranged to extend forwardly from the rail 60 intermediate the arms 70 and being disposed with its outer end portion 82 projecting above the plane of the arms 70 as particularly shown in Fig. 4.

Means are provided for adjusting the tension of the spring 80 which is here shown as embodying a screw 83 threaded upwardly through a bracket 84 affixed to the front rail 16 of the frame A, and which screw forms an abutment on which the intermediate portion 81 of the spring 80 seats. Adjustment of the screw 83 vertically acts to raise or lower the outer end portion of the spring 80.

The tray holder F is designed to be swung on the pivot pins 62 to dispose a tray carried thereon into an inverted position on the screen carrier D; the latter being adapted to be swung upwardly and forwardly to meet a tray being swung upwardly and rearwardly on the holder F. As a means for facilitating dislodgment of products carried by the tray tending to stick thereto, the frame D is fitted at its outer end corners with a pair of impact plates 85 arranged to project on a plane above the members of the frame D and to which the members 85 are affixed by bolts 86. Fig. 6 shows one of these impact plates in perspective, from which view it will be seen that said plates are thick and heavy enough to cause a distinct shock to the tray mounting means when it is forcibly swung against them, therefore forming an efficient means to dislodge any products which may tend to stick to the tray.

As a means for facilitating raising and lowering of the screen carrying frame D either one or both sides thereof is fitted with a handle 87 which projects upwardly into easy reach of the operator.

In the operation of the invention a suitable quantity of coating material, such as frosting, is placed in the reservoir 23 and heated to a desired state of fluidity by heating the water content of the basin 21 by means of the electrical heating element 22. The load of the frosting together with that of the structural parts of the double boiler B normally disposes the latter in a depressed position relative to the frame A with the tubes 26 bearing on and compressing the springs 29, thus placing the latter under tension.

In effecting the application of a coat of frosting to bakery products such as coffee-cakes, buns, rolls, and the like, a tray T, such as is employed in baking the products and carrying the latter as indicated at P, is positioned with one end portion thereof on the tray holder F by depositing the bottom of the tray on the spring 80 and arms 70 and then advancing the tray so that the side edges thereof will extend between and be engaged by the inturned flanges 71; the tray being advanced until its forward end will be disposed beneath the ledge 78 on the rail 60. During this application of the tray the supporting member 68 may be shifted laterally in opposition to the spring 76 in event the tray be of width slightly greater than the normal spacing between the flanges 71 of the supporting members 67 and 68 as indicated in dotted lines in Fig. 3. The tray will then be positioned as shown in Fig. 8. The operator then elevates the screen carrying frame D by swinging the latter upwardly and forwardly through the medium of one of the handles 87 to an inclined position forward of the vertical as shown in Fig. 8; the frame D turning on the pivots 48. At the same time the operator swings the tray T upwardly on the holder F with the latter turning on the pivot pins 62 so that the products P carried on the tray are brought into contact with the screen E. The tray T and the frame D are then swung rearwardly and downwardly until the frame D reaches its normal horizontal position on the frame C whereupon the lever 55 is actuated to swing the cross bar 57 into a position overlying the outer end of the frame D to thereby hold the latter against upward displacement. The operator then elevates the tray T slightly and slams the outer end thereof against the impact plates 85 so as to dislodge such of the products P as may tend to cling or stick to the bottom of the tray.

Figure 2:
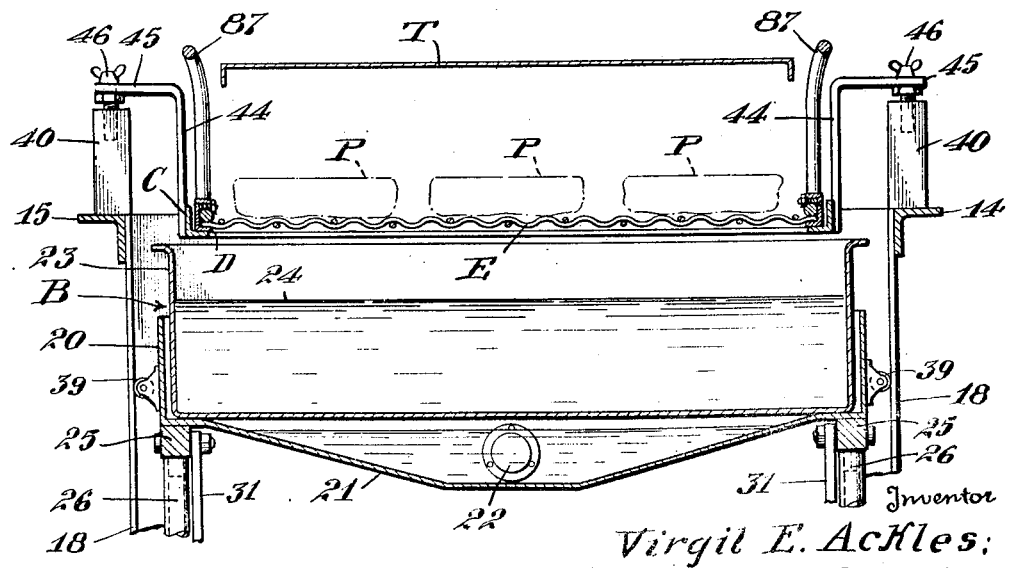
Fig. 2 is a view in cross section of the upper portion of the machine as seen on the line 2—2 of Fig. 1 in the direction indicated by the arrows.

In this fashion the products P are disposed in an inverted position on the screen E as indicated in dotted lines in Fig. 2. The parts will then be disposed as shown in Fig. 9. The operator then elevates the tray T a short distance and depresses the foot bar 38 so as to exert a forward pull on the connected ends of the toggle links 31 and 32 through the lever arms 37 and links 36 thereby straightening the toggles and effecting elevation of the double boiler B so as to bring the upper surface of the frosting 24 into contact with the down-turned upper surfaces of the products P resting on the screen E as shown in Fig. 10, thus effecting application of a coating of the frosting to the products. This operation is performed with but slight exertion on the part of the operator because as the elevation of the reservoir decreases the lifting power of the springs thus is offset by the increase of lifting leverage resulting from the approach of the toggles toward their dead centers.

A more satisfactory frosting operation results from moving the reservoir B upward to bring the body of frosting material therein into contact with the products to be frosted and then downwardly from said products, than would result if the products were moved downward upon and then withdrawn from the body of frosting material. If the products were quickly withdrawn upwardly from said body of frosting material the tendency of inertia would be to leave the applied frosting behind in the boiler, but no tendency of this kind will result from operating the machine in the manner which has been described, even when such operation is performed as rapidly as possible. The pressure on the foot bar 38 is then relieved whereupon the double boiler will gravitate to its lowermost position and will be cushioned on its downward movement by the springs 29. The lever 55 is then operated to disengage the bar 57 from the outer end of the screen carrying frame B whereupon the operator swings the latter upwardly to bring the bakery products thereon into contact with the then rearwardly inclined tray T as shown in Fig. 11 in which position excess frosting will drip from the products and drain back into the reservoir 23. The frame D and the tray T are then swung upwardly and forwardly to a position past the vertical whereupon the frame D is returned to its normal position while the tray holder is being swung forwardly and downwardly to its normal position where it will come to rest when the spring 80 moves to its seated position on the screw 83; the spring 80 then serving to cushion this landing of the tray holder. The loaded tray is then withdrawn from the tray holder whereupon the machine is cleared in readiness for another operation.

While I have shown and described a specific embodiment of the invention I do not limit myself to the exact details of construction and arrangement shown and may make such changes in the parts and construction thereof as occasion may require coming within the purview of the appended claims.

I claim:

1. In a machine for frosting bakery products, a screen, a mounting for said screen hinged for vertical swinging movement, a tray holder, means for engaging a tray on said holder, pivotal connections between said holder and said screen mounting whereby a tray carried by said holder and said screen may be swung face to face, and impact members on said screen mounting against which a tray on the tray holder may be impacted, said impact members being of sufficient weight to cause a distinct shock to a tray when the latter is forcibly swung against them.

2. The subject matter of claim 1 and, said impact members consisting of plates secured to the upper side of said screen mounting in a position to be contacted by those portions of a tray being swung by said tray mounting which are farthest from the axis of swing.

3. In a machine for frosting bakery products, a frame, a vertically movable frosting reservoir, means for guiding said reservoir on said frame, means carried on said frame above said reservoir for supporting products to be frosted, supporting means for said reservoir including springs arranged to hold said reservoir in a partly elevated position, and means operable by man power to supplement the action of said springs to lift said reservoir into a cooperative relation to said product supporting means, said man power operable means including a lever element fulcrumed on said frame and connected to said reservoir whereby an increase of lifting leverage is obtained as the upward movement of the reservoir causes a lessening of the assisting force of said springs.

4. In a machine of the kind described, an upstanding frame, frosting means mounted on said frame including a pair of spaced apart arms which normally extend in a generally horizontal direction away from said frame, an upwardly bent leaf spring mounted in a fixed relation to said arms and having an upwardly swelled portion which projects above the plane in which said arms normally lie, said spring being positioned to cushion the descent of a loaded tray as it is deposited upon said arms, said spring at such time yielding downwardly to permit the tray to contact with both of said arms, and means to swing said arms together with the tray mounted upon them to and from the frosting position.

5. In a machine of the kind described, an upstanding frame, a reservoir to contain frosting material, means carried by said frame to guide said reservoir during vertical movements, means to raise and lower said reservoir including two pair of toggle arms arranged in a horizontally spaced relation to each other, each pair of toggle arms consisting of a lower arm and an upper arm, the lower arm having its upper end pivoted to the lower end of the upper arm, a horizontally extending link connecting together the pivotal connection of each pair of said toggle arms, and a foot operable lever consisting of a lateral extension of one of the lower toggle arms, said pair of toggle arms being swingable by pressure upon said lever to a more nearly straightened out position for the purpose of raising and lowering said reservoir.

6. In a machine of the kind described, an upstanding frame, frosting means mounted on said frame including a pivotally mounted horizontally extending rail, a pair of spaced apart arms in a fixed relation to said rail normally extending outwardly therefrom, a spring arm carried by said rail and projecting therefrom between the arms of said pair, said spring arm projecting farther from the rail than the other arms and having its outer portion bowed upwardly and normally projecting above the plane in which the other two arms lie, thereby providing means to cushion the descent of a loaded tray as it is deposited upon said pair of arms, said spring arm at such times yielding downwardly to permit the tray to contact with and rest upon both arms of said pair, the aforesaid rail being swingable about its axis together with all three of said arms carried thereby to and from a position for inverting said tray to apply frosting thereto, and means to hold said tray upon said pair of arms while it is being swung to and from such inverted position.

VIRGIL E. ACKLES.